No. 891,007. PATENTED JUNE 16, 1908.
W. A. ROBERTS & F. W. STUDT.
MOTOR TRUCK VALVE CONTROLLING MECHANISM.
APPLICATION FILED MAR. 26, 1907.
5 SHEETS—SHEET 3.
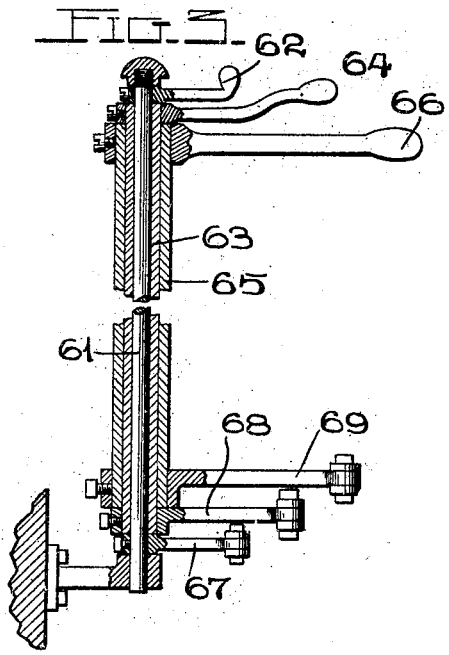
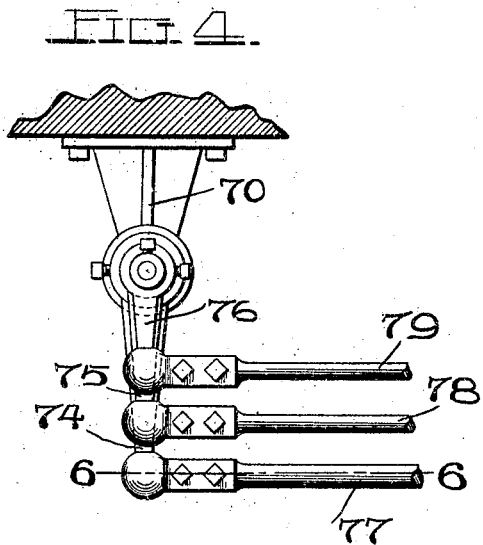
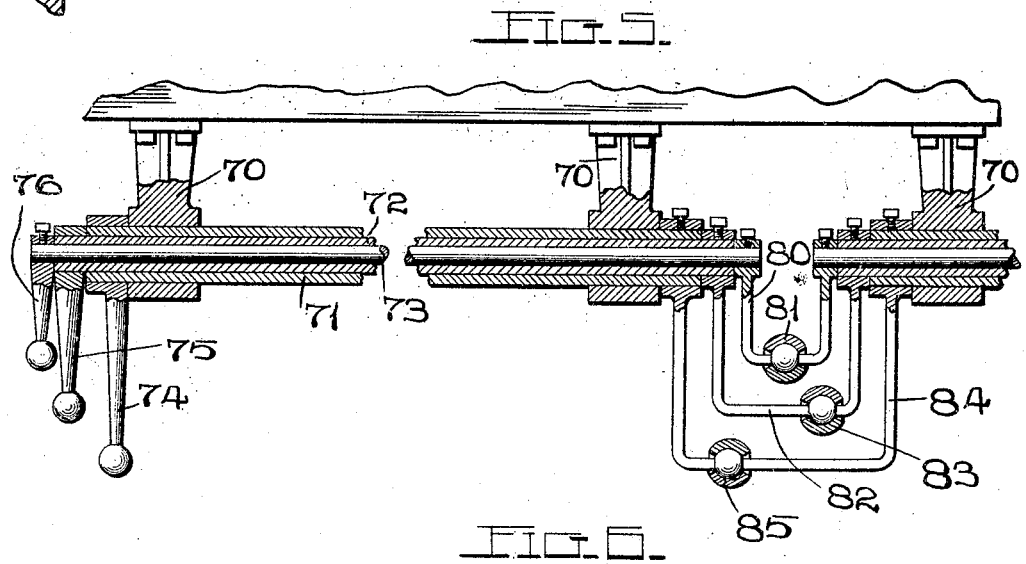
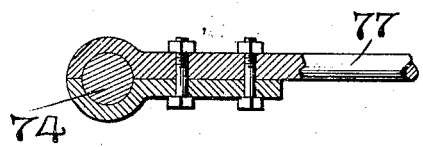
ATTEST.
H. J. Fletcher.
M. O. Smith.
INVENTORS.
WILLIAM A. ROBERTS.
FERDINAND W. STUDT.
BY Higdon & Longan.
ATT'YS.

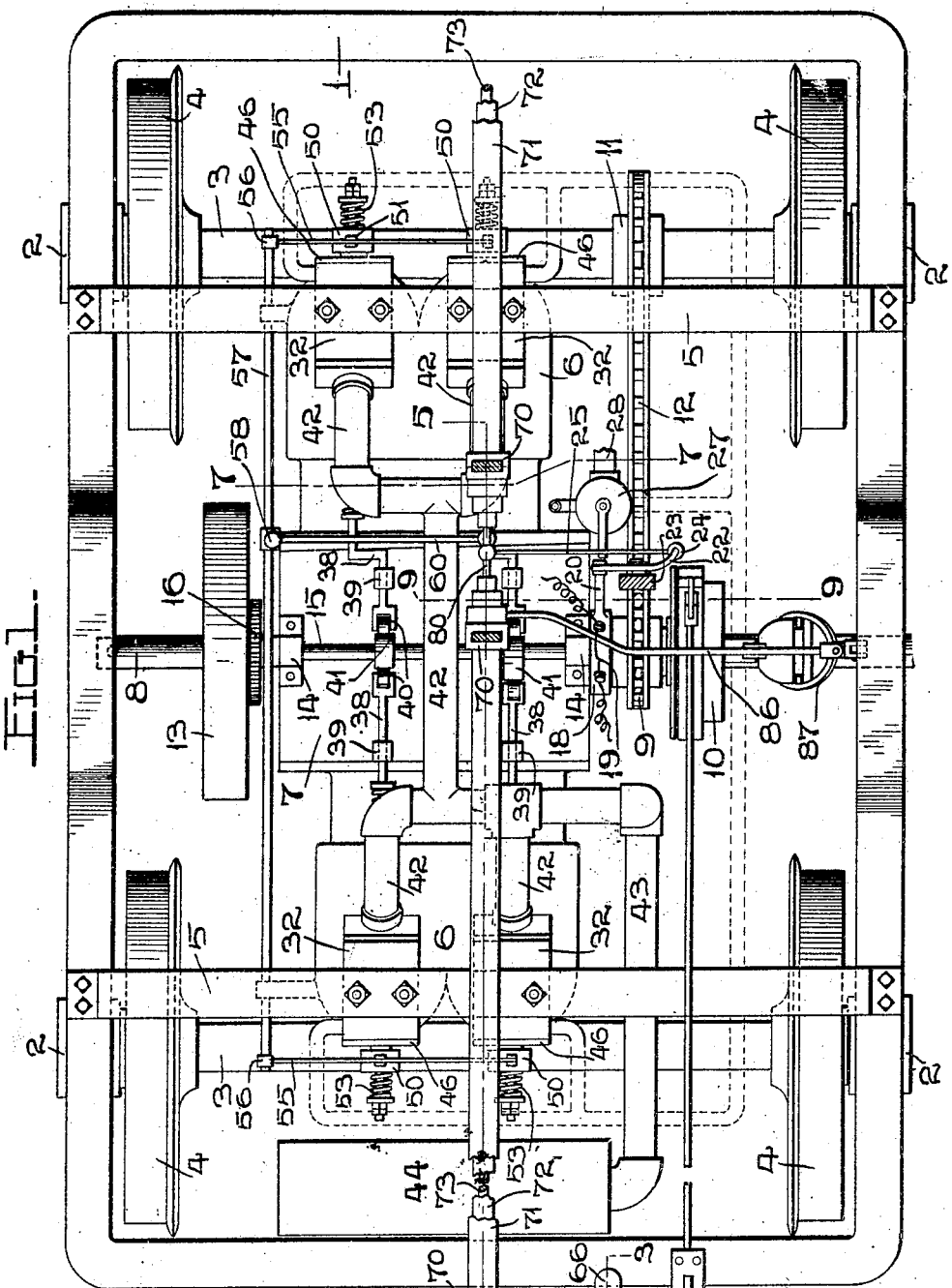

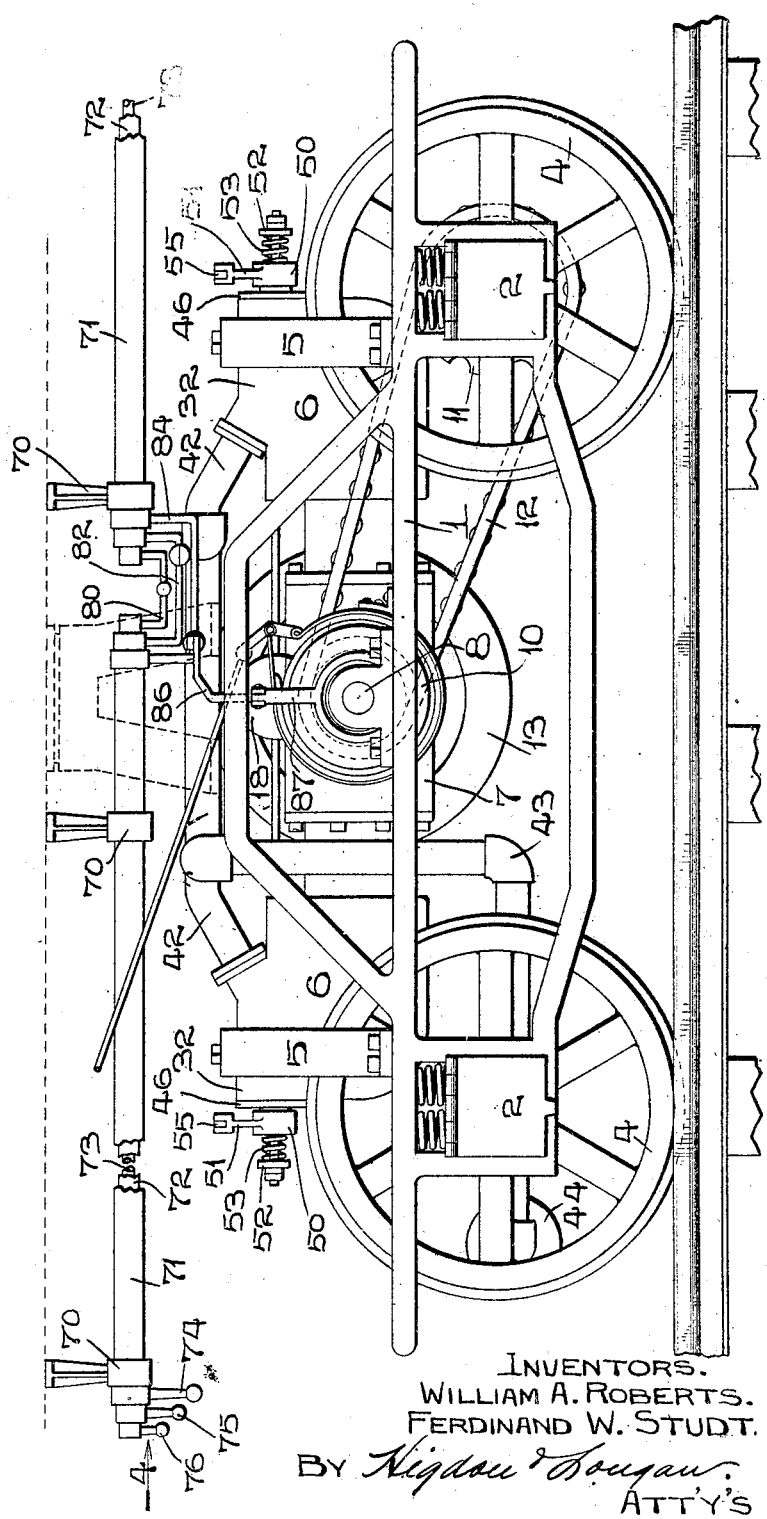

No. 891,007. PATENTED JUNE 16, 1908.
W. A. ROBERTS & F. W. STUDT.
MOTOR TRUCK VALVE CONTROLLING MECHANISM.
APPLICATION FILED MAR. 26, 1907.
5 SHEETS—SHEET 4.
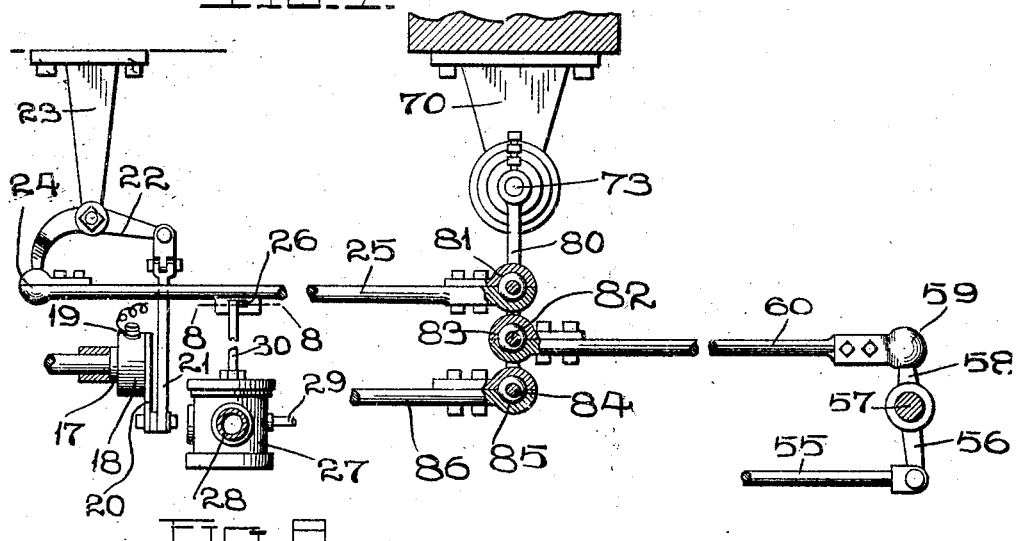
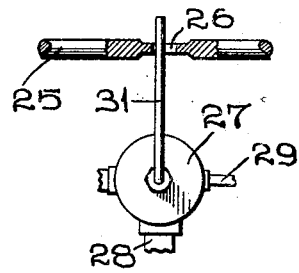
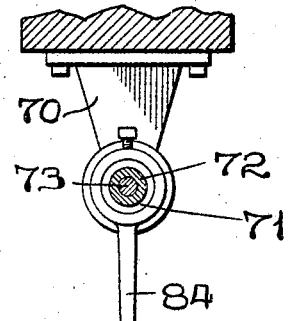
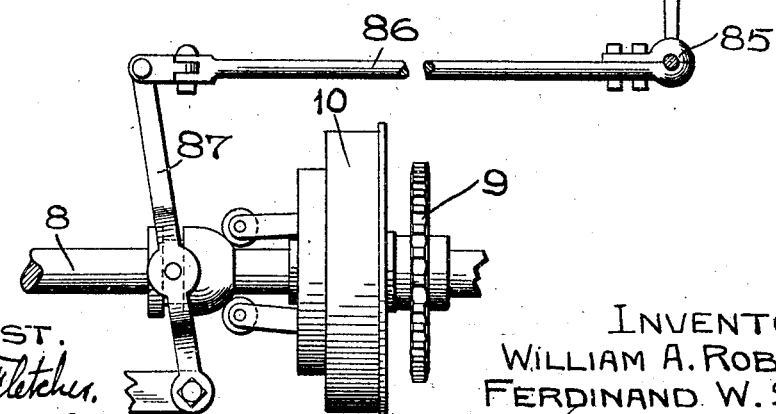
ATTEST.
H. J. Fletcher
M. P. Smith
INVENTORS.
WILLIAM A. ROBERTS.
FERDINAND W. STUDT.
BY Higdon & Longan
ATT'YS No. 891,007. PATENTED JUNE 16, 1908.
W. A. ROBERTS & F. W. STUDT.
MOTOR TRUCK VALVE CONTROLLING MECHANISM.
APPLICATION FILED MAR. 26, 1907.
5 SHEETS—SHEET 5.
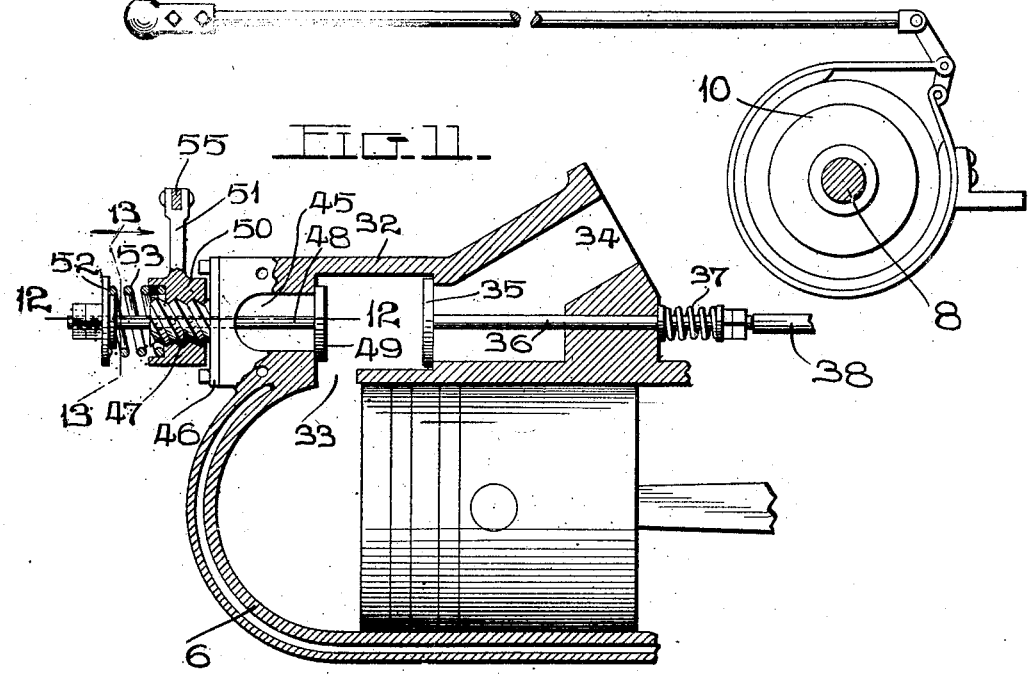
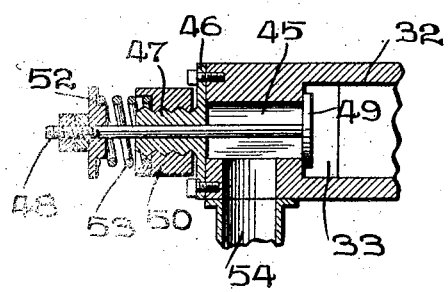
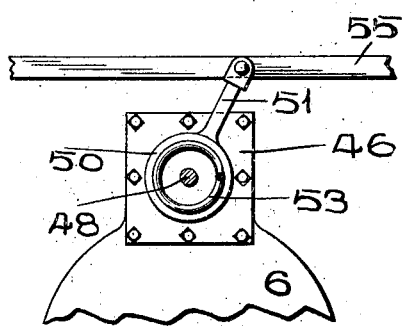
ATTEST.
H. J. Fletcher.
M. P. Smith.
INVENTORS.
WILLIAM A. ROBERTS.
FERDINAND W. STUDT.
BY Higdon & Longan
ATTY'S.

UNITED STATES PATENT OFFICE.

WILLIAM A. ROBERTS AND FERDINAND W. STUDT, OF FERN RIDGE, MISSOURI.

MOTOR-TRUCK VALVE-CONTROLLING MECHANISM.

No. 891,007.      Specification of Letters Patent.      Patented June 16, 1908.

Application filed March 26, 1907. Serial No. 364,660.

*To all whom it may concern:*

Be it known that we, WILLIAM A. ROBERTS and FERDINAND W. STUDT, citizens of the United States, and residents of Fern Ridge, St. Louis county, Missouri, have invented certain new and useful Improvements in Motor-Truck Valve-Controlling Mechanism, of which the following is a specification containing a full, clear, and exact description, reference being had to the accompanying drawings, forming a part hereof.

Our invention relates generally to motor trucks, and more particularly to the valve controlling and operating mechanism for the internal combustion engines of the motor trucks, the object of our invention being to provide simple, inexpensive and easily operated controlling mechanism whereby the valves on the internal combustion engines of of motor trucks are readily actuated and controlled.

To the above purposes, our invention consists in certain novel features of construction and arrangement of parts, which will be hereinafter more fully set forth, pointed out in the claims, and illustrated in the accompanying drawings, in which:—

Figure 1 is a plan view of a motor truck equipped with our improved valve controlling mechanism; Fig. 2 is a side elevation of the truck as seen in Fig. 1; Fig. 3 is an enlarged vertical section taken on the line 3—3 of Fig. 1; Fig. 4 is an enlarged elevation looking in the direction indicated by the arrow 4, (Fig. 2); Fig. 5 is an enlarged vertical section taken on the line 5—5 of Fig. 1; Fig. 6 is a horizontal section taken on the line 6—6 of Fig. 4; Fig. 7 is an enlarged transverse section taken on the line 7—7 of Fig. 1; Fig. 8 is a horizontal section taken on the line 8—8 of Fig. 7; Fig. 9 is an enlarged transverse section taken on the line 9—9 of Fig. 1; Fig. 10 is an elevation of a reversing device made use of on our improved motor truck; Fig. 11 is a vertical section taken longitudinally through the center of one of the engine cylinders of our improved truck, and showing the inlet and exhaust valve in said cylinder; Fig. 12 is a horizontal section taken on the line 12—12 of Fig. 11; Fig. 13 is a vertical section taken on the line 13—13 of Fig. 11.

In the construction of the truck as shown, we make use of a pair of side frames 1, which are provided with the usual journal boxes 2, in which the ends of the axles 3, carrying the car wheels 4 operate. Fixed to the side frames 1, at points adjacent the journal boxes 2, are arch bars 5, each of which supports a pair of engine cylinders 6, which face one another; and said cylinders being connected by the hollow crank chamber casing 7, in which is journaled the transversely arranged engine shaft 8. Loosely mounted on the engine shaft 8, adjacent the crank casing, is a sprocket wheel 9, which is engaged by an ordinary clutch 10, which is fixed on said engine shaft; and fixed on one of the axles 3, in alinement with the sprocket wheel 9, is a sprocket wheel 11; and said sprocket wheels are connected by a chain 12.

Fixed on the engine shaft on the opposite side of the crank casing from the clutch 10 is a fly wheel 13, and arranged for rotation in bearings 14 fixed to the top of the crank casing is a transversely arranged shaft 15, which is driven by suitable gearing, such as 16, from the engine shaft 8. Fixed on the end of the shaft 15, adjacent the sprocket wheel 9, is a commutator 17, of ordinary form, surrounded by the usual casing 18, which carries the contact points 19, and which latter are electrically connected with the spark plugs in the ends of the engine cylinders 6. Fixed to the casing 18 and extending downwardly therefrom is an arm 20, to the lower end of which is pivotally connected a link 21, and the upper end of said link is pivotally connected to a horizontally disposed lever 22, which is fulcrumed to a bracket 23 extending downwardly from the car body. Connected by a ball and socket joint 24 to the opposite end of the lever 22 is a horizontally disposed rod 25, and formed on or fixed thereto is a plate provided with an aperture 26.

27 designates a carbureter, of ordinary form, into which leads an air pipe 28, and a liquid hydrocarbon pipe 29; and extending upwardly from the controlling valve on the interior of said carbureter is a stem 30, the upper end of which is bent horizontally, as designated by 31, and said horizontally bent portion extends through the aperture 26.

Each engine cylinder is provided on top with an integral housing 32, the chamber on the interior of which communicates with the interior of the cylinder by means of a port 33, and one end of the chamber in the housing 32 forms an exhaust port 34, in which is arranged an exhaust valve 35, the stem 36 of which extends to the exterior of the housing 32, and there being an expansive coil spring 37 mounted on said stem between the housing and the washer held upon the stem.

The springs 37 normally hold the exhaust valves 35 closed until the stems 36 are engaged by the outer ends of rods 38, which are held to slide through bearings 39 integral with the crank casing, and the inner ends of said rods being provided with anti-friction rollers 40 which are engaged by cams 41 fixed on the shaft 15. These cams are set to operate the exhaust valves at the proper intervals during the operation of the engines, and all of the exhaust ports 34 are connected by suitable tubes 42, which lead and are connected to a single exhaust pipe 43, which in turn is connected to a suitable muffler 44.

Leading into the chamber in each housing 32, opposite the exhaust port, is a gas inlet port 45, and closing the outer end thereof is a plate 46, with which is formed integral an outwardly projecting lug 47, the exterior of which is provided with a thread or threads having an extreme pitch. Arranged to slide through the lug 47 is a stem 48, the inner end of which carries a valve 49, adapted to close the passageway between the port 45 and the port 33, and arranged for movement upon the screw threaded lug 47 is a collar 50, provided with an integral arm 51. Located on the outer end of the stem 48 is a disk 52, and interposed between said disk and the collar 50 is an expansive coil spring 53.

Leading from the carbureter 27 to each of the housings 32 and communicating with the inlet ports 45 are tubes 54, which convey the gas or carbureted air to the engine cylinders, after which said gas or air is ignited.

Pivotally connected to the upper ends of each pair of arms 51 are the horizontally arranged rods 55, the outer ends of which are connected to the lower ends of arms 56, which are fixed to and extend downwardly from the ends of a rock shaft 57, journaled in suitable bearings carried by an oppositely arranged pair of the engine cylinders 6; and fixed to the rock shaft 57 is an upwardly projecting arm 58, which is connected by a ball and socket joint 59 to a transversely arranged rod 60.

Mounted on the platform or floor of the car supported by our improved truck is a vertically disposed shaft 61, on the upper end of which is fixed a handle 62; and arranged for rotation on said shaft is a tubular shaft 63, provided at its upper end with a handle 64, and arranged for rotation on said tubular shaft 63 is a tubular shaft 65, provided on its upper end with a handle 66. Fixed respectively on the lower ends of the shaft 61, tubular shaft 63, and shaft 65 are the laterally projecting arms 67, 68, and 69.

Arranged for rotation in suitable bearings 70, depending from the under side of the car body, is a sleeve 71, in which is held for rotation a tubular shaft 72, and in which latter is arranged for rotation a shaft 73; and the forward ends of said sleeve, tubular shaft, and shaft terminate adjacent the lower end of the vertically disposed shaft 61; and fixed respectively on said sleeve, tubular shaft, and shaft, are the depending arms 74, 75, and 76, the lower ends of which are respectively connected by ball and socket joints to horizontally arranged rods 77, 78, and 79 to the arms 67, 68, and 69.

The sleeve 71, tubular shaft 72, and rod 73 are preferably formed in sections of suitable length, and the ends of one pair of sections terminate adjacent the crank casing 7; and connecting the adjacent ends of the sections of the rod 73 is a U-shaped link 80, the lower end of which is connected by means of a ball and socket joint 81 with the end of the rod 25, opposite the end that connects with the lever 22.

The adjacent ends of the sections of the tubular shaft 72 are connected by a U-shaped member 82, the lower end of which is connected by means of a ball and socket joint 83 with the end of the rod 60, opposite the end that is connected to the arm 58.

The adjacent ends of the sections of the sleeve 71 are connected by a U-shaped member 84, the lower end of which is connected by a ball and socket joint 85 to a horizontally disposed rod 86, which extends laterally, and is pivotally connected to the upper end of a lever 87, which controls the cone or sliding member of the clutch 10.

When our improved motor truck is in operation, the sparking devices in the end of the cylinder are controlled by the positions of the casings 18 on the commutators, which casings are all correspondingly shifted by movement of the handle 62, which imparts rotary motion to the shaft 61; and motion is imparted to the link 21, which is connected to the casing 18 through the various coöperating parts 22, 25, 80, 73, 76, 79, and 67, which latter part is fixed on the lower end of the shaft 61.

Simultaneous with the shifting of the casing 18 the position of the carbureter valve is changed, owing to the engagement of the upper ends of the valve stem 30 with the rod 25, and thus the inlet of air and liquid hydrocarbon to the carbureter is varied as the sparks in the engine cylinders are advanced or retarded.

The degree to which the valves 49 are permitted to open to allow the inlet of gas or carbureted air is regulated by shifting the handle 64, which, through the action of the coöperating parts 63, 68, 78, 75, 72, 82, 60, 58, 57, 56, and 55, which latter parts are connected to the arms 51 of the collars 50; and, as said collars are partially rotated, they will move outwardly upon the screw threaded lugs 47, thus compressing the springs 53, which action necessarily limits the inward movement of the stems 48, and consequently limits the area of the openings through the inlet ports 45.

The valves 49 are opened by suction as the pistons move to the lower ends of the cylinders 6, and when said pistons return to the upper ends of the cylinders, the charges are fired within said cylinders in the usual manner to drive the pistons to the lower ends of the cylinders, and thus imparting rotary motion to the engine shaft 8 in the usual manner. As said engine shaft 8 rotates, the shaft 15 is correspondingly rotated by the gearing 16, and the cams 41 correspondingly actuate the rods 38 to cause the outer ends thereof to engage against the stems 36, thus opening the exhaust valves 35 at the proper intervals; and the exhaust from the engine cylinder passes out through the ports 34 and is conveyed through the tubes 42 to the pipe 43, and from thence to the muffler 44.

The clutch 10, which is arranged on the end of the shaft 8, and by means of which the rotary motion of said engine shaft is transmitted to the sprocket wheel 9, and in turn to the car axle 3, is shifted and controlled by actuating the handle 66, which imparts the proper motion to the lever 87 by means of the co-acting parts 65, 69, 77, 74, 71, 84, and 86, which last mentioned part is connected to the upper end of said lever 87.

Thus it will be seen how we have constructed a simple, compact motor truck, and provided simple controlling devices therefor, the handles of which controlling devices are located immediately adjacent one another, and which handles and devices readily control the position of the commutator, which governs the sparking in the engine cylinders, the valve or valves within the carbureter, the degree to which the gas or carbureted air inlet valves are opened, and the throwing in, or releasing, of the clutch located on the engine shaft.

We claim:—

1. The combination with a series of internal combustion engines, of a carbureter for supplying fluid fuel to the cylinders of the engines, inlet valves controlling the supply of fluid fuel from the carbureter to the engine cylinders, means arranged on the inlet valves for regulating the degree to which said valves are opened, and controlling devices for simultaneously operating the carbureter valve and the inlet valve regulating means.

2. In an apparatus of the class described, an internal combustion engine, an inlet valve arranged on the engine cylinder through which fluid fuel is delivered to the cylinder, a screw threaded lug arranged on the cylinder through which the stem of the valve operates, a nut located on the outer end of the valve stem, a spring arranged on the valve stem between the screw threaded lug and the nut, a collar operating on the screw threaded lug and against which collar one end of the spring engages, and means whereby said collar is rotated on the lug.

3. The combination with a series of internal combustion engines of a carbureter for supplying fluid fuel to the engine cylinders, a commutator for controlling the ignition devices in the engine cylinders, inlet valves controlling the supply of fluid fuel to the engine cylinders, means arranged on the inlet valves for regulating the degree to which said valves are opened, and controlling devices for simultaneously shifting the commutator and the carbureter valve, and for actuating the valve regulating means.

In testimony whereof, we have signed our names to this specification, in presence of two subscribing witnesses.

WILLIAM A. ROBERTS.
FERDINAND W. STUDT.

Witnesses:
  M. P. SMITH,
  E. M. HARRINGTON.